(12) United States Patent
Minn et al.

(10) Patent No.: US 10,088,096 B2
(45) Date of Patent: Oct. 2, 2018

(54) PORTABLE STAND FOR ELECTRONIC DEVICE

(71) Applicant: KENU, Inc., San Francisco, CA (US)

(72) Inventors: Kenneth Y. Minn, San Francisco, CA (US); David E. Yao, San Francisco, CA (US); Leonard John Duran, Mill Valley, CA (US)

(73) Assignee: KENU, INC., San Francisco, CA (US)

( * ) Notice: Subject to any disclaimer, the term of this patent is extended or adjusted under 35 U.S.C. 154(b) by 0 days.

(21) Appl. No.: 15/525,918

(22) PCT Filed: Nov. 5, 2015

(86) PCT No.: PCT/US2015/059252
§ 371 (c)(1),
(2) Date: May 10, 2017

(87) PCT Pub. No.: WO2016/077149
PCT Pub. Date: May 19, 2016

(65) Prior Publication Data
US 2017/0307133 A1      Oct. 26, 2017

Related U.S. Application Data

(60) Provisional application No. 62/079,529, filed on Nov. 13, 2014.

(51) Int. Cl.
*F16M 11/00* (2006.01)
*F16M 13/00* (2006.01)
(Continued)

(52) U.S. Cl.
CPC .......... *F16M 13/00* (2013.01); *F16M 11/041* (2013.01); *F16M 11/14* (2013.01);
(Continued)

(58) Field of Classification Search
USPC ..................................................... 248/122.1
See application file for complete search history.

(56) References Cited

U.S. PATENT DOCUMENTS 4,214,724 A * 7/1980 Geiger .................. F16M 11/14
248/167
4,648,698 A * 3/1987 Iwasaki ............... F16M 11/105
248/163.1

(Continued)

FOREIGN PATENT DOCUMENTS

CN           1770823 A       5/2006
CN         102080759 A       6/2011
(Continued)

OTHER PUBLICATIONS

Office Action dated Apr. 24, 2018, in Japanese Patent Application No. 2017-524354.
(Continued)

*Primary Examiner* — Monica E Millner
(74) *Attorney, Agent, or Firm* — Vierra Magen Marcus LLP

(57) ABSTRACT

A portable support apparatus for an electronic device. The portable support apparatus can be connected to an electronic device to provide support. The portable support apparatus has a central portion which has a yolk retainer coupled to a proximal end of a central leg, and a central foot coupled to a distal end of the central leg. The portable support apparatus can also include side-support portions coupled to the central portion. The side support portions can be deployable to form a tripod. The adjustable device receiver can include a ball-connector which is received within a receiving yolk and a tongue coupled to the ball-connector. The tongue can be configured to be insertable into an opening of an electronic device.

27 Claims, 14 Drawing Sheets

(51) Int. Cl.
*F16M 11/04* (2006.01)
*F16M 11/14* (2006.01)
*F16M 11/38* (2006.01)
*F16M 11/24* (2006.01)
*F16M 13/06* (2006.01)
*G06F 1/16* (2006.01)

(52) U.S. Cl.
CPC ........... *F16M 11/242* (2013.01); *F16M 11/38* (2013.01); *F16M 13/06* (2013.01); *G06F 1/166* (2013.01); *G06F 1/1626* (2013.01); *F16M 2200/041* (2013.01)

(56) References Cited

U.S. PATENT DOCUMENTS

| | | | | |
|---|---|---|---|---|
| 5,043,750 | A * | 8/1991 | Yamaguchi | F16M 11/40 248/163.1 |
| 6,254,044 | B1 | 7/2001 | Lee | |
| 6,695,268 | B1 * | 2/2004 | Hsieh | A47B 19/002 248/188.7 |
| 7,128,297 | B2 * | 10/2006 | Lee | H04M 1/0214 248/187.1 |
| 7,422,379 | B2 * | 9/2008 | Agevik | F16M 11/041 206/316.2 |
| 7,669,814 | B2 * | 3/2010 | Bogel | F16M 11/16 248/163.1 |
| 7,684,694 | B2 * | 3/2010 | Fromm | F16M 11/14 396/376 |
| 8,197,149 | B2 * | 6/2012 | Darrow | F16M 11/041 248/168 |
| 8,596,597 | B1 * | 12/2013 | Spicer | F16M 11/38 15/230.11 |
| 8,726,439 | B2 * | 5/2014 | Orzeck | B25F 1/003 248/126 |
| 8,858,097 | B2 * | 10/2014 | Hale | F16M 11/14 396/428 |
| 8,961,220 | B2 * | 2/2015 | Hilbourne | H01R 13/516 439/502 |
| 9,057,935 | B2 * | 6/2015 | Vieira Caeiro Dias Antunes ....... F16M 11/123 |
| 9,097,379 | B1 * | 8/2015 | Strasser | F16M 11/04 |
| 9,341,306 | B2 * | 5/2016 | Amussen | F16M 11/40 |
| 9,465,278 | B2 * | 10/2016 | Lytle | G03B 17/561 |
| 2005/0122424 | A1 * | 6/2005 | Overstreet | F16M 11/041 348/373 |
| 2011/0023238 | A1 | 2/2011 | Orzeck et al. | |
| 2012/0269503 | A1 | 10/2012 | Hale | |
| 2013/0005401 | A1 * | 1/2013 | Rosenhan | G06F 1/1626 455/557 |
| 2013/0148295 | A1 * | 6/2013 | Minn | G06F 1/163 361/679.59 |
| 2013/0270002 | A1 | 10/2013 | Fawcett | |
| 2013/0309901 | A1 | 11/2013 | Hillbourne | |
| 2014/0228075 | A1 | 8/2014 | Baschnagel | |

FOREIGN PATENT DOCUMENTS

JP S6341146 U 3/1988
JP 2001-059600 A 3/2001

OTHER PUBLICATIONS

Search Report dated Jun. 22, 2018, in European Patent Application No. 15859734.4.
Office Action and Search Report dated Jul. 3, 2018, in Chinese Patent Application No. 201580061865.1.

* cited by examiner

PORTABLE STAND FOR ELECTRONIC DEVICE

CROSS-REFERENCE TO RELATED APPLICATION

This application claims priority to and benefit under 35 U.S.C. § 119(e) of U.S. Provisional Patent Application Ser. No. 62/079,529, filed Nov. 13, 2014 and entitled, "Portable stand for an electronic device," which is incorporated by reference herein in its entirety as if fully set forth below.

FIELD

The subject matter herein relates generally to portable support devices and in particular to a foldable tripod for an electronic device.

BACKGROUND

Tripod assemblies typically include three legs which that can deploy out to form a support structure for devices such as cameras. Such as assemblies, however, are usually difficult to use in terms of mounting to their associated device or in terms of how each leg becomes stable. In turn, such tripods have been known to be unstable for smaller, mobile computing devices and may also require relatively stable, flat surfaces.

Such tripods are therefore limited in the manner in which they can be used, their ease of use, and the support that they may impart to their respective device.

It is with respect to these and other considerations that the various embodiments described below are presented.

SUMMARY

At least one embodiment within this disclosure is a portable support apparatus for an electronic device. The portable support apparatus can be connected to an electronic device to provide support. The portable support apparatus can have a central portion which has a yolk retainer coupled to a proximal end of a central leg. The central portion may also have a central foot coupled to a distal end of the central leg, wherein a longitudinal axis may be running therealong from the proximal end to the distal end of the central portion. The portable support apparatus can also include a first side-support portion which has a first shoulder pivotally coupled to a first side of the central portion, and a first side-leg coupled to a first side-foot.

The portable support apparatus can also include a second side-support portion which has a second shoulder pivotally coupled to a second side of the central portion (opposite the first side of the central portion), as well as a second side-leg coupled to a second side-foot. Furthermore, the portable support apparatus can include a ball joint comprising a receiving yolk which is connected to the yolk retainer. The ball joint can include an adjustable device receiver which can be removably attached to a device, such as an electronic device, like a cell phone or camera, for example. The adjustable device receiver can include a ball-connector which is received within the receiving yolk, and a tongue coupled to the ball-connector, the tongue configured to be insertable into, and received within, an opening of an electronic device.

In at least one embodiment, the portable support apparatus has a portable configuration in which the first side-leg and the second side-leg are comprised within a side profile of the central portion, and a deployed configuration, in which the first side-leg and the second side-leg are each pivotally deployed at a predetermined angle with respect to the longitudinal axis of the central portion. The predetermined angle can be in excess of one hundred and thirty degrees (130°). It will be understood that when the portable support apparatus is in the deployed configuration, it can form a tripod. In at least one embodiment, the predetermined angle can be less than one hundred and thirty degrees (130°). In at least one embodiment, the predetermined angle is formed with respect to a plane formed by the longitudinal axis of the central portion and an axis running between a first yolk shoulder and a second yolk shoulder.

In at least one embodiment of the portable support apparatus, the central foot, the first side-foot, and the second side-foot, can form an equilateral triangle when the portable support apparatus is in the deployed configuration. Additionally, the adjustable device receiver can be eccentric with respect to a circle running through the corners of the equilateral triangle formed when the portable support apparatus is in the deployed configuration. This can increase stability with which an electronic device is supported by the portable support apparatus.

In at least one embodiment, the connecting ball of the adjustable device receiver is resiliently pivotable and resiliently rotable within a receiving area of the receiving yolk. In at least one embodiment, the adjustable receiver can have a predetermined maximum range of pivotation of one hundred and eleven degrees (111°) with respect to the longitudinal axis of the central portion. In at least one embodiment, the adjustable receiver can have a predetermined maximum range of pivotation of twenty-eight degrees (28°) with respect to an axis which is perpendicular to the longitudinal axis of the central portion.

In at least one embodiment, either the first side-leg or the second side-leg, or both, have an opening tool formed therein. In at least one embodiment, the opening tool comprises a fillet and an indent portion formed in the side-leg. The fillet and the indent portion can be adjacent to one another, with the fillet being a greater distance from the receiving yolk than the indent portion. The opening tool can be a bottle opener.

In at least one embodiment, the ball-connector and the tongue are integrally formed of a material such as hard plastic. In at least one embodiment, the receiving yolk can be configured to exert a compressive force upon the ball-connector. The receiving yolk can be formed of a material comprising a plastic softer than that of the ball-connector. The central leg, the first side-leg and the second side-leg can be composed of Zinc alloy, stainless steel, brass, aluminum alloy, spring steel, or plastic resin.

In at least one embodiment, the central leg, the first side-leg and the second side-leg can have hollows formed in their sides, which can reduce the weight of the portable support apparatus.

In other embodiments, a portable support device for a portable computing device is provided. A central portion having proximal and distal ends may be used and a yolk retainer can be positioned on the proximal end of the central portion. A central foot can be positioned on the distal end of the central portion. A first side portion can have a proximal end pivotally coupled to a first side of the central portion and a first foot of the first side portion can be positioned on a distal end opposite the proximal end of the first side portion. Similarly, a second side portion can have a proximal end pivotally coupled to a second side of the central portion and a second foot of the second side portion can be positioned on a distal end opposite the proximal end of the second side portion. A ball joint can be rotably engaged with the yolk retainer so that it is rotatable between a plurality of positions and orientations. A device receiver can be coupled to the ball joint and operable to be removably coupled to the portable computing device.

The central and side portions in this embodiment can be operable to move between portable and deployed configurations. In this respect, the portable configuration can be defined by the first and second side portions being axially aligned with a longitudinal axis running from the proximal to distal ends of the central portion. Each of these portions can therefore being planar with each other. In contrast, in the deployed configuration the first and second side portions can be pivotally deployed from the portable configuration to a predetermined angle. The predetermined angle can be formed with respect to a plane formed by the longitudinal axis of the central portion and an axis running between first and second yolk shoulders positioned opposite each other on the ball joint.

The predetermined angle can be at least one hundred and thirty degrees. In the deployed configuration, the central and side portions can form a tripod operable to mechanically attach to and move the portable computing device between the plurality of positions and orientations. Additionally, in the deployed configuration, the central, first, and second feet can form an equilateral triangle.

In other embodiments, the device receiver can be eccentric with respect to a circle running through corners of the equilateral triangle formed when the device is in the deployed configuration. The connecting ball of the device receiver can also be resiliently rotatable within a receiving area of the yolk retainer. The device receiver can have a predetermined rotational range of one hundred and eleven degrees with respect to the longitudinal axis running defined by the ends of the central portion. The device receiver can also have a predetermined rotational range of twenty-eight degrees with respect to a plane perpendicular to an axis running between first and second yolk shoulders positioned opposite each other on the ball joint. The device receiver can be aligned with a longitudinal axis of the central portion.

In some embodiments, a receiving yolk of the ball joint can exert a compressive force upon a ball-connector of the device receiver to move the device receiver between the predetermined rotational range. Each of the first and second side portions can also be operable to be rotated in the deployed configuration until contacting respective first and second stop supports of the central portion.

The stop supports can be oriented in a predetermined angle relative to the longitudinal axis of the central portion so that the respective side portion is flush with the respective stop portion in the deployed configuration. One or both of the stop supports can include a locking mechanism to secure the stop support to the respective side portion and the locking mechanism can be a click fit connector, a band, or a hook and loop fastener.

In other embodiments, a method of forming a tripod for a portable computing device is disclosed. The method may include the following steps: coupling a central leg to first and second side legs, each of the side legs being pivotally coupled to opposite sides of the central leg between and pivotable between a predetermined range of rotation from portable and deployed configurations; wherein the portable configuration is defined by central and side legs being generally planar with each other and wherein the deployed configuration is defined by each of the side legs being rotated away from the central leg about respective pivots of the central portion to form the tripod; positioning a yolk retainer on a proximal end of the central portion; rotably engaging a ball joint with the yolk retainer, the ball joint being rotatable between a plurality of positions and orientations; and coupling a device receiver to the ball joint, the device receiver being operable to be removably coupled to the portable computing device.

Other aspects and features of the present disclosure will become apparent to those of ordinary skill in the art, upon reviewing the following detailed description in conjunction with the accompanying figures.

BRIEF DESCRIPTION OF THE DRAWINGS

Implementations of the present technology will now be described, by way of example only, with reference to the attached figures, wherein.

DETAILED DESCRIPTION

Figure 1A:
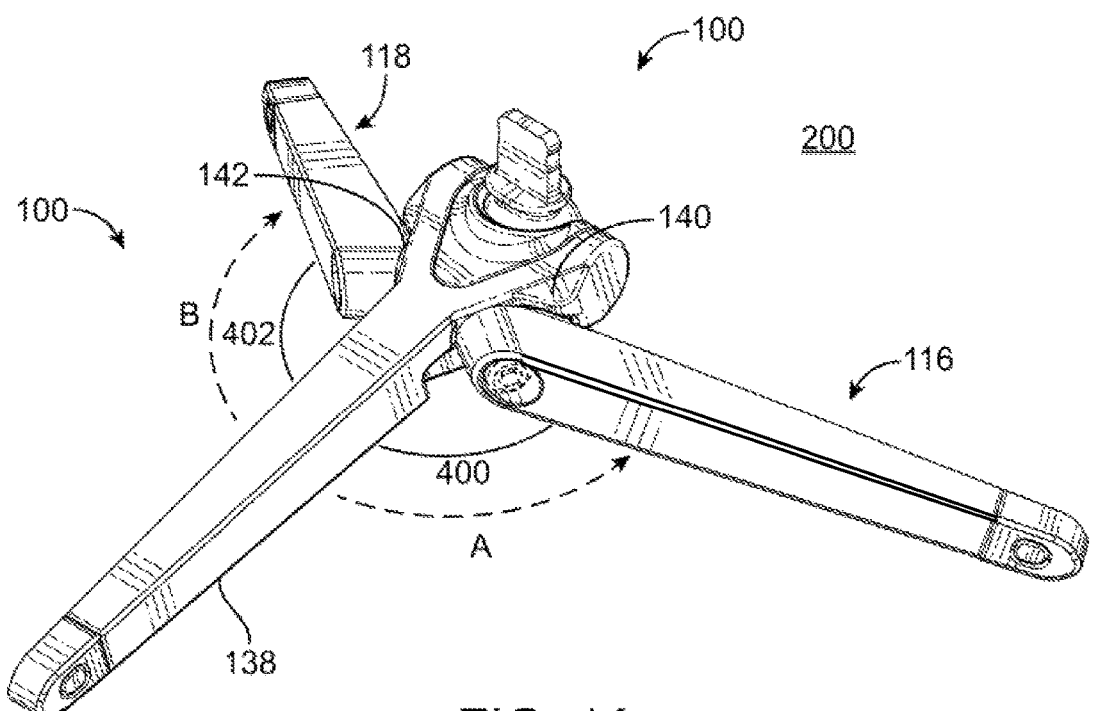
FIG. 1A illustrates a support device in accordance with an exemplary embodiment.

For simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Additionally, although example embodiments of the disclosed technology are explained in detail, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. By "comprising" or "containing" or "including" it is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

Turning to the figures, FIG. 1A illustrates a portable support device 100 in a deployed configuration 200. The portable support device 100 can be made of any material, such as a metal or a plastic. In at least one embodiment, the portable support device 100 can be made of zamak 5 zinc alloy. However, the portable support device 100 is not so limited and can also be made of stainless steel, spring steel, and/or brass. The portable support device 100 can have a central leg 138, a first side-support portion 116, and a second side-support portion 118. The first side-support portion 116 can be configured to pivot in relation to the central leg 138 along a direction A. The first side-support portion 116 can pivot until blocked by a first stop support 140, forming an angle 400 in the deployed configuration 200. The first stop support 140 can be positioned such that the first side-support portion 116 is angled to raise the portable support device 100. The second side-support portion 118 can be configured to pivot in relation to the central leg 138 along a direction B. The second side-support portion 118 can pivot until blocked by the second stop support 142, forming an angle 402 in the deployed configuration 200. The second stop support 142 can be positioned such that the second stop support 118 is angled to raise the portable support device 100.

Figure 1B:
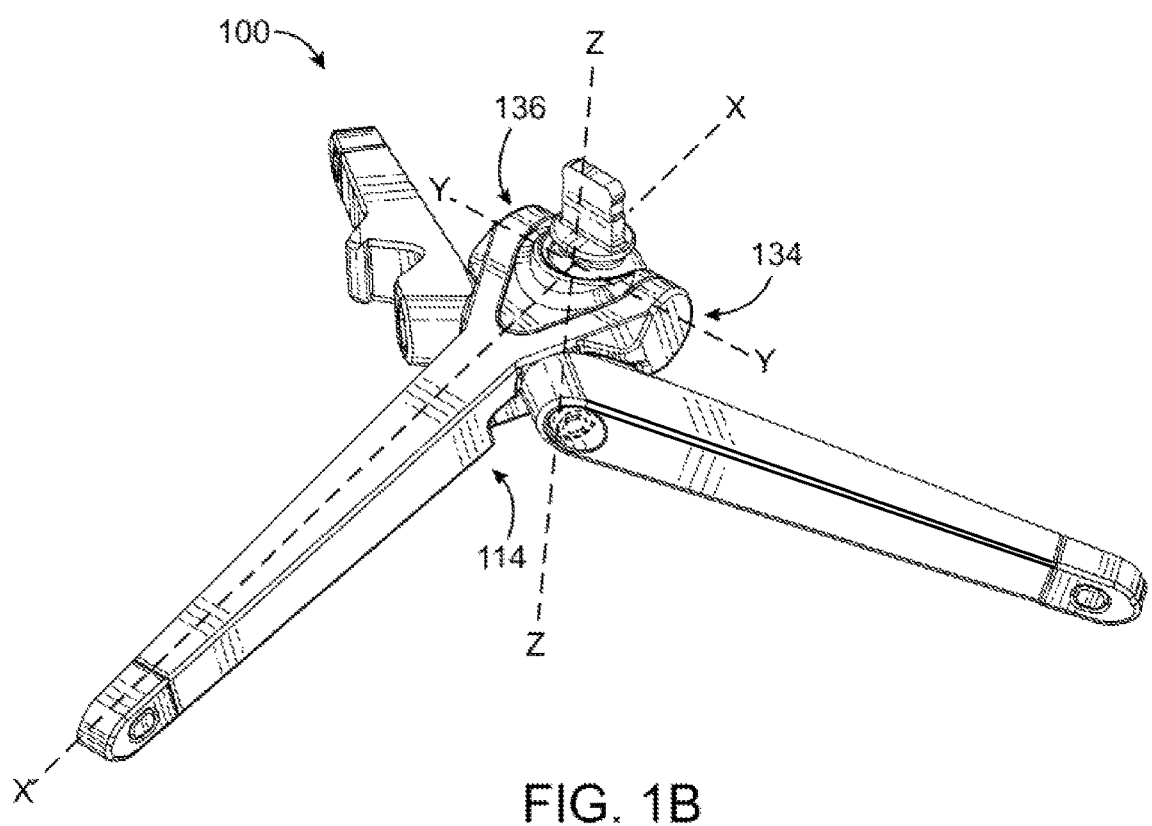
FIG. 1B illustrates a portable support device with an opening tool in accordance with an exemplary embodiment.

FIG. 1B illustrates that the portable support device 100 can include an opening tool 150. As shown in FIG. 1B, the portable support device 100 is in a deployed configuration 200. The portable support device 100 can have a first axis X-X along a central portion 114. The portable support device can have a second axis Y-Y running between a first yolk shoulder 134 and a second yolk shoulder 136.

It is understood that each of first and second stop supports 140 and 142 may extend outwardly from leg 138 and may be integrally formed with yolk shoulders 134 and 136 as shown or one, or both, may be removably attached thereto. Additionally, each of angles 400 and 402 may be fixed as with shoulders 134 and 136 depicted in FIG. 1A or may be adjustable across any number of angle depending of preference or need. Finally, a locking mechanism may be provided between supports 140 and 142 with respective portions 116 and 118 to securely engage each portion as desired or needed in the deployed configuration.

Figure 2:
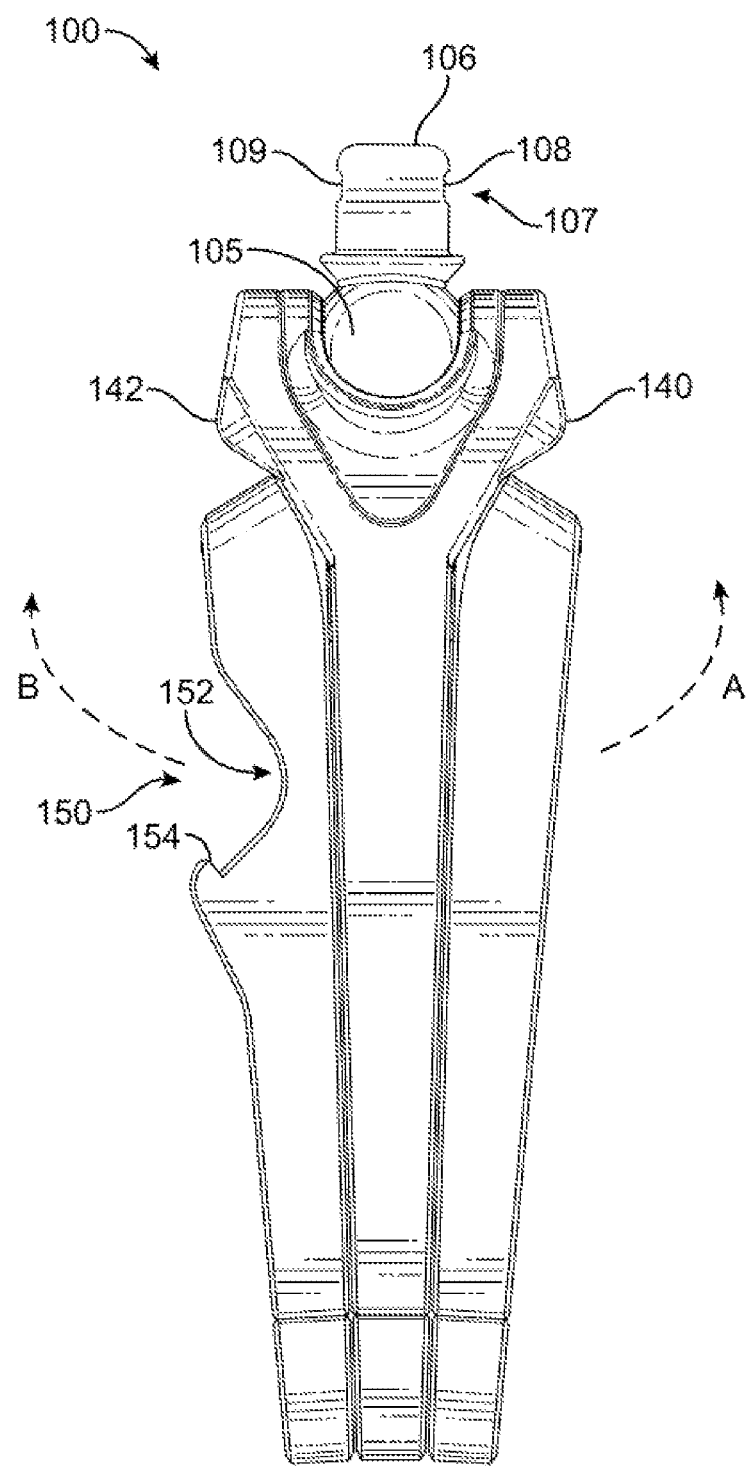
FIG. 2 illustrates a portable support device in a portable configuration in accordance with an exemplary embodiment.
Figure 3:
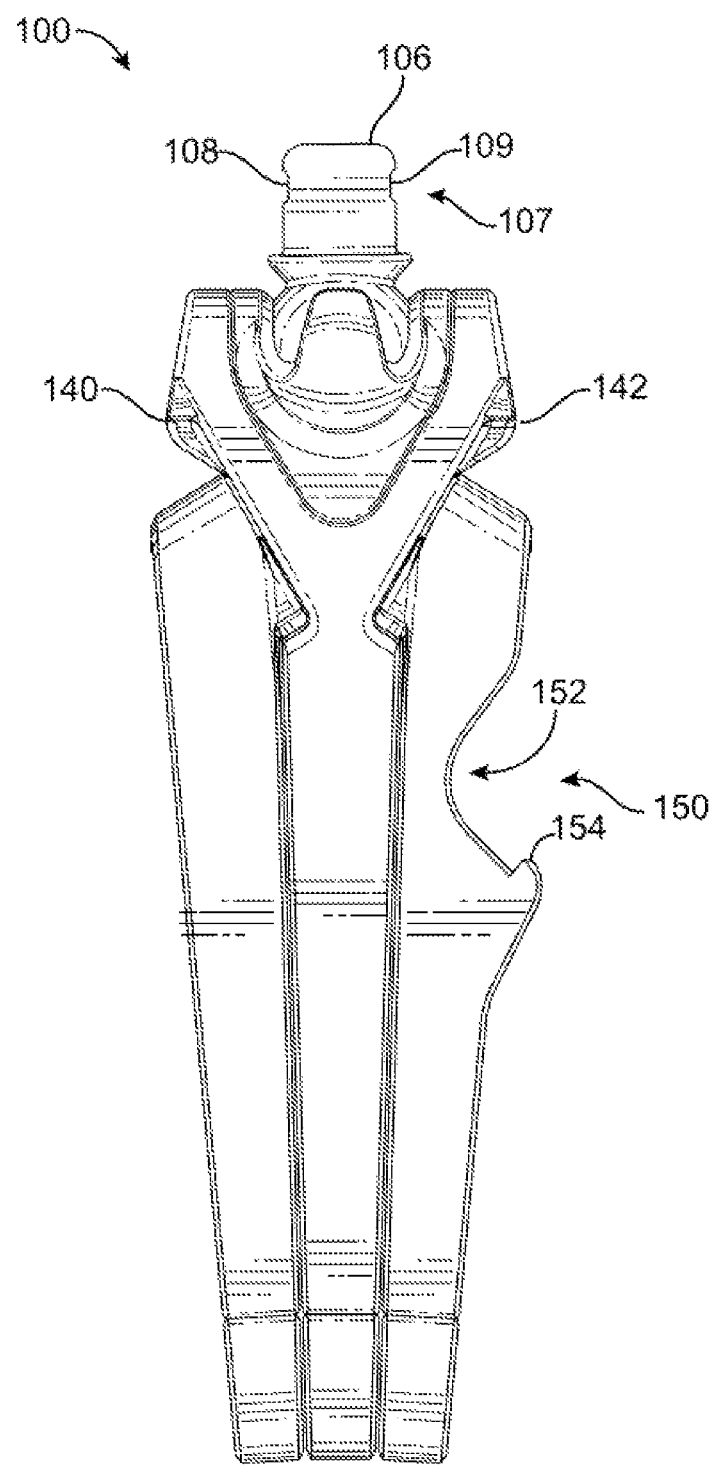
FIG. 3 is similar to FIG. 2, but viewed from another angle in accordance with an exemplary embodiment.

FIGS. 2 and 3 illustrate the portable support device 100 including an opening tool 150 in a portable configuration 300. In the portable configuration, it can be seen that portions 114, 116, and 118 are assembled adjacent each other and portions 116 and 118 are no longer pivoted outwardly in contact with associated supports 140 and 142.

When in the portable configuration 300, the central leg 138, the first side-support portion 116 and the second side-support portion 118 can be axially aligned and/or generally planar with each other thereby permitting portions 114, 116 and 118 to be assembled with each other. In this respect, configuration 300 may provide device 100 with a highly portable form factor that can quickly unfold to the deployed configuration 200 depicted in FIGS. 1A and 1B.

As can be seen, the portable support device 100 can include a tongue 106 disposed above and/or in communication with shoulders 134 and 136. The tongue 106 can be inserted into and received by an electronic device 500. In at least one embodiment, the tongue 106 can be configured to be received in a charging port of device 500. In other embodiments, the tongue 106 can be configured to be received in a Lightning port, a micro-USB port, and/or be plugged into an audio port of device 500. Additionally, the tongue 106 may be operable to securely engage and/or mechanically support corresponding device 500 when received by device 500. In this respect, the tongue 106 can optionally include a recessed portion or waist 107 that can correspond to the electronic device 500 for a stable connection. The waist 107 can include indents 108, 109 that can further stabilize the connection to the electronic device 500.

The tongue 106 can also be connected to a ball 105. The ball 105 can be rotatable within the portable support device 100. The ball 105 can rotate so that device 500 may be adjustable between any number of orientations and/or positions during use.

In at least one embodiment, the opening tool 150 can be included on the first side-support portion 116. In other embodiments, the opening tool 150 can be included on the second side-support portion 118. The opening tool 150 can include an indent portion 152 and a fillet 154. In at least one embodiment, the opening tool 150 can be used to open bottles. The bottle cap can be inserted into the indent portion 152. The fillet 154 can clip the bottom of the bottle cap, and with added torque, the bottle cap can be disengaged from the bottle. Additionally, the tool 150 may be integrally formed with portion 118 as depicted or may be removably attached therewith. Other tools 150 may also be incorporated with portion 116 or leg 138. Finally, opening tool 150 may not necessarily be an opening tool. Instead, in those embodiments where tool 150 is removably attached to device 100, tool 150 may be any other tool including a stylus for device 500, a remote mechanism operable to wirelessly communicate with and/or control device 500, or the like.

Figure 4A:
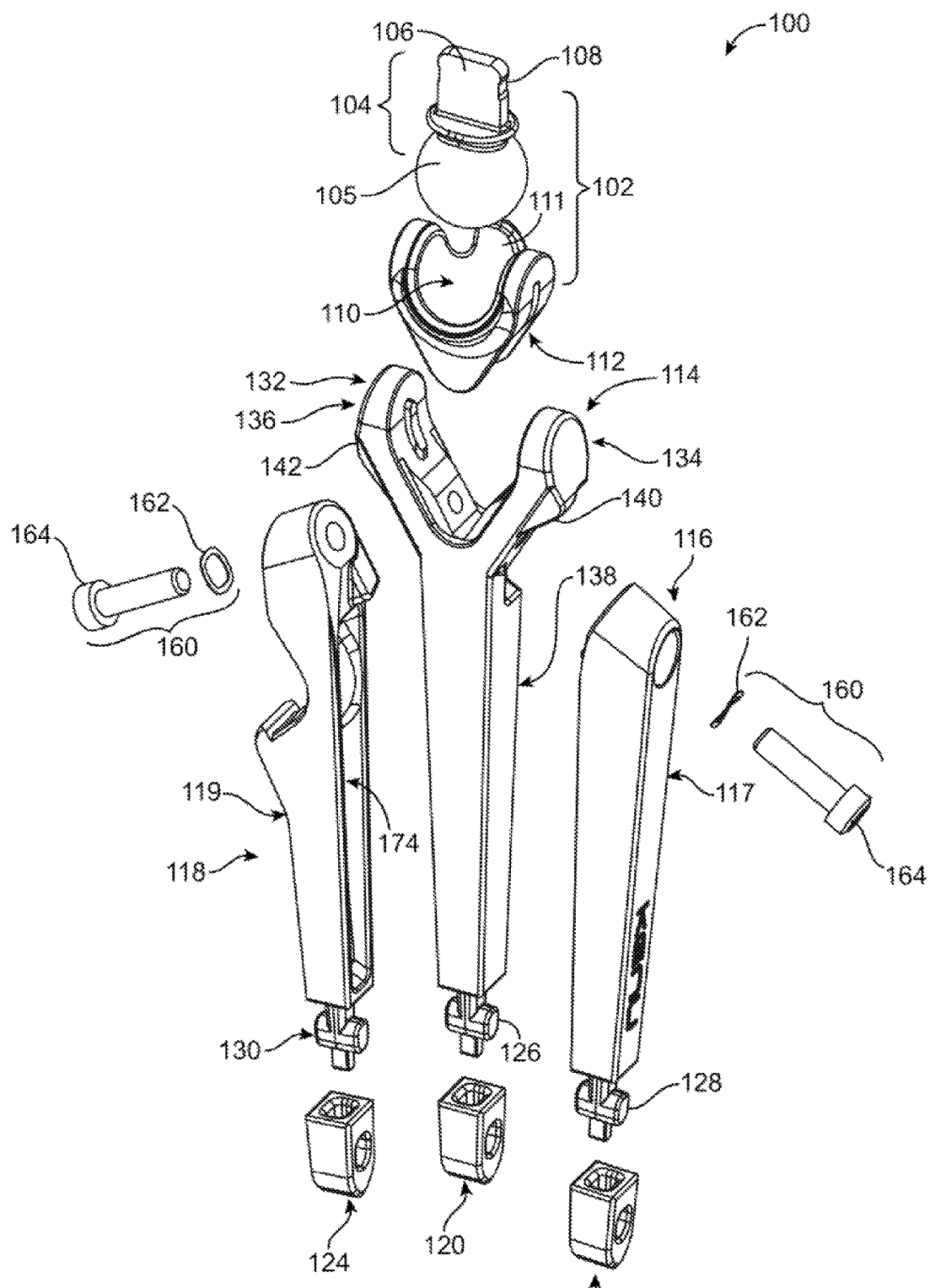
FIG. 4A illustrates an exploded view of a portable support device in accordance with an exemplary embodiment.

FIG. 4A illustrates an exploded view of the herein disclosed portable support device 100. As can be seen, the first side-support portion 116 and the second side-support portion 118 can be pivotally coupled to the central portion 114. In at least one embodiment, the first side-support portion 116 and the second side-support portion 118 can be pivotally coupled to the central portion 114 by a coupling device 160.

As can be seen, the coupling device 160 can include a washer 162 and an engagement device 164. The engagement device 164 may be defined by an elongate member, bolt, screw, rod, pin, or any other fastening mechanism that extends from a wider base portion and can pass through the washer 162. Multiple engagement devices 164 may be provided as seen in FIG. 4A and pivotally couple the respective first side-support portion 116 and the respective second side-support portion 118 to the central portion 114.

The central portion 114 can include a yolk retainer 132. The yolk retainer 132 can include a first yolk shoulder 134 and a second yolk shoulder 136. The first yolk shoulder 134 and second yolk shoulder 136 can include the first support stop 140 and second support stop 142, respectively. As can be seen, the yolk retainer 132 may be in a cradle shape operable to receive and securely engage yolk 112.

The portable support device 100 can also include a joint 102. The joint 102 can include an adjustable device receiver 104 and a receiving yolk 112. The adjustable device receiver 104 can include the previously-described tongue 106 and the ball 105. The receiving yolk 132 can include a ball receiver 110. The ball receiver 110 can receive the ball 105. The ball 105 can rotate within the ball receiver 110 and the ball receiver 110 can include a device receiver stopper 111. The device receiver stopper 111 can restrict the rotation of the ball 105. By restricting the rotation of the ball 105, the orientation of the electronic device 500 when securely engaged with the tongue 106 is also restricted. The receiving yolk 112 can be received by the yolk retainer 132. When the receiving yolk 112 is received by the yolk retainer 132, the first yolk shoulder 134 and second yolk shoulder 136 can exert a clamping force on the joint 102. In certain embodiments, the clamping force allows the ball 105 to rotate, but only when the clamping force is applied. In most instances during normal operation, if no clamping force is applied, the ball 105 can maintain its position even with the electronic device 500 securely attached thereto, regardless of the angle of the electronic device 500.

Figure 7:
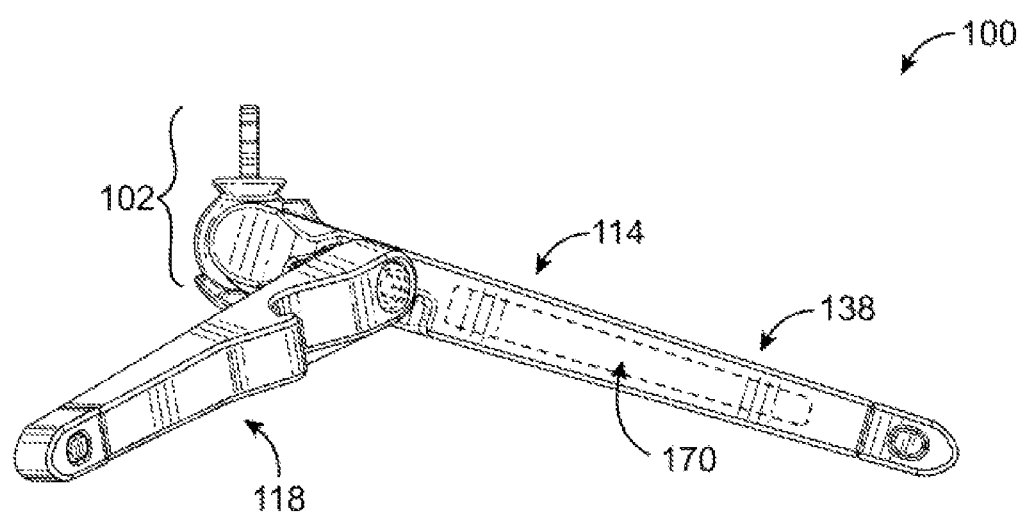
FIG. 7 illustrates a left elevational view of a portable support device in a deployed configuration in accordance with an exemplary embodiment.

In at least one embodiment, the central leg 138 of the central portion 114 can be hollow and/or bored out to decrease the weight while maintaining the structural strength. In other embodiments, the central leg 138 can have a hollow chamber 170 (as shown in FIG. 7) to decrease the weight while still maintaining structural strength. Optionally, chamber 170 may be defined by one or ribs, trusses, or structural members to provide structural reinforcement to leg 138. In at least one embodiment, the hollow chamber 170 can be on a side of the central leg 138 (as shown in FIG. 7). In other embodiments, the hollow chamber 170 can be on any side of the central leg 138.

Turning back to FIG. 4A, the central portion 114 can include a central foot receiver 126 on the distal end of the central leg 138. The central foot receiver 126 can be configured to receive a central foot 120. The central foot 120 can be made of any material, such as metal or plastic, and the central foot 120 can be made of any material to induce traction, such as rubber.

Figure 5:
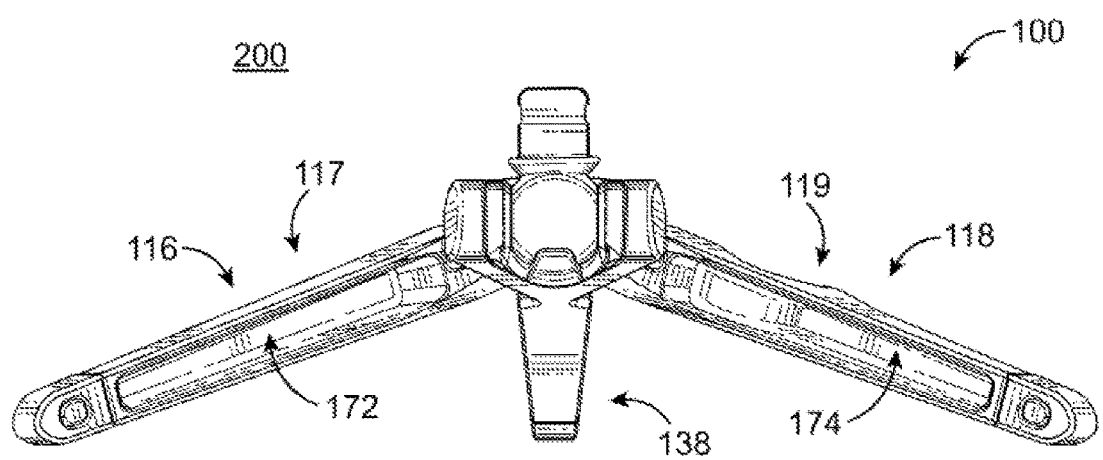
FIG. 5 illustrates a rear view of a portable support device in a deployed configuration in accordance with an exemplary embodiment.

The first side-support portion 116 can also include a first side leg 117. In at least one embodiment, the first side leg 117 can be hollow to decrease the weight while maintaining the structural strength. In other embodiments, the first side leg 117 can have a hollow chamber 172 (as shown in FIG. 5) to decrease the weight while maintaining structural strength. The first side-support portion 116 can include a first side foot receiver 128 on the distal end of the first side leg 117. The first side foot receiver 128 can be configured to receive a first side foot 122. The first side foot 122 can be made of any material, such as metal or plastic. In at least one embodiment, the first side foot 122 can be made of any material to induce traction, such as rubber.

The second side-support portion 118 can include a second side leg 119. In at least one embodiment, the second side leg 119 can be hollow to decrease the weight while maintaining the structural strength. In other embodiments, the second side leg 119 can have a hollow chamber 174 to decrease the weight while maintaining structural strength. (See FIGS. 4A and 5). The second side-support portion 118 can include a second side foot receiver 130 on the distal end of the second side leg 119. The second side foot receiver 130 can be configured to receive a second side foot 124. The second side foot 124 can be made of any material, such as metal or plastic. In at least one embodiment, the second side foot 123 can be made of any material to induce traction, such as rubber.

It is to be noted that each of the feet 120, 122, and 124 may also include an elastomer positioned on its lower, surface contacting portion to reduce impact or shock that may be absorbed or received through feet 120, 122, and 124 during use. While feet 120, 122, and 124 may be removably attached to the respective portions as depicted, the device 100 is not so limited and instead, feet 120, 122, and 124 may be integrally formed therewith.

Figure 4B:
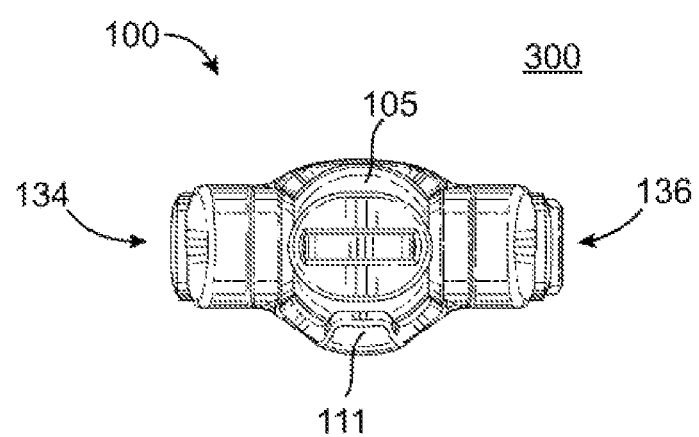
FIG. 4B illustrates a top plan view of a portable support device in accordance with an exemplary embodiment.

FIG. 4B illustrates a top view of the portable support device 100. As shown, the portable support device 100 is in the previously-described portable configuration 300. The ball 105 can be seen held by the first yolk shoulder 134 and the second yolk shoulder 136 prevents the ball 105 from rotating freely. The device receiver stopper 111 can be included in the rear of the ball receiver 110, further restricting the rotation of the ball 105.

Figure 6:
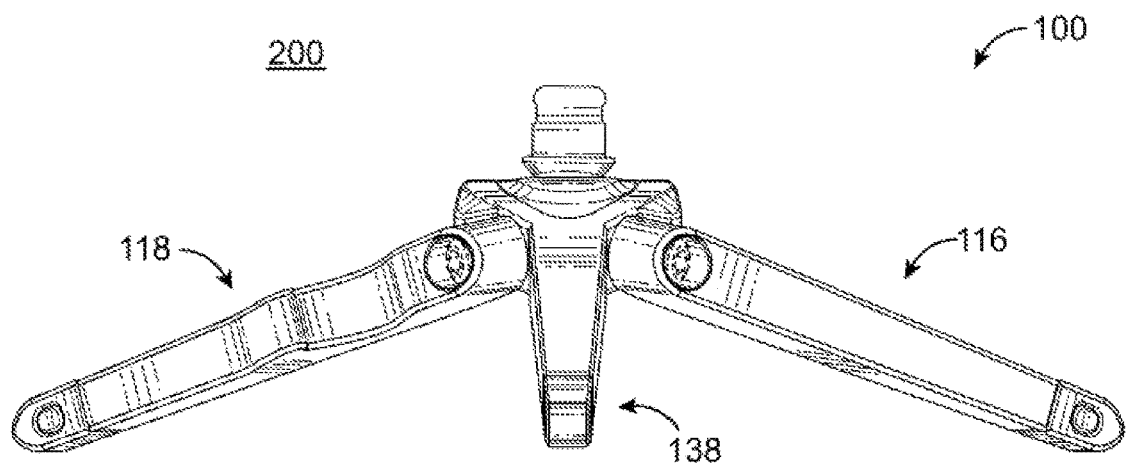
FIG. 6 illustrates a front view of a portable support device in a deployed configuration in accordance with an exemplary embodiment.

FIGS. 5 and 6 illustrate rear and front views, respectively, of the portable support device 100 in the previously-described deployed configuration 200. The deployed configuration 200 can be achieved when the first side-support portion 116 and the second side-support portion 118 pivot until blocked by the first support stop 140 and second support stop 142. Along with the central leg 138, the first side-support portion 116 and the second side-support portion 118 can create an equilateral triangle stance. This configuration is particularly advantageous as it adds both stability and elevation to the corresponding electronic device 500.

FIG. 5 also illustrates that, in at least one embodiment, the central leg 138 can be hollow to decrease the weight while maintaining the structural strength. In other embodiments, the central leg 138 can have a hollow chamber 170 to decrease the weight while maintaining structural strength. In at least one embodiment, the first side leg 117 can be hollow to decrease the weight while maintaining the structural strength. In other embodiments, the first side leg 117 can have a hollow chamber 172 (as shown in FIG. 5) to decrease the weight while maintaining structural strength. In at least one embodiment, the second side leg 119 can be hollow to decrease the weight while maintaining the structural strength. In other embodiments, the second side leg 119 can have a hollow chamber 174 to decrease the weight while maintaining structural strength.

FIG. 7 illustrates a left elevational view of the portable support device 100 in a deployed configuration 200. As mentioned above, along with the central leg 138, the first side-support portion 116 and the second side-support portion 118 can create an equilateral triangle stance. The joint 102 can be located at on offset distance from the center of the equilateral triangle stance. When the electronic device 500 is tilted back to face the front of the electronic device 500 upward toward the user, the offset can move the center of mass for the electronic device 500 to more closely align with the center of the equilateral triangle stance. This alignment can improve the stability of the portable support device 100. Additionally, the backward tilt can move the center of mass of the electronic device 500 toward the rear of the stance while the offset moves the center of mass forward.

FIGS. 8A-8D illustrate a right elevational view of the portable support device 100 in a portable configuration 300. FIGS. 8A-8D also illustrate that, in the portable configuration 300, the first side-support portion 116, the second side-support portion 118, and the central portion 114 align to form a profile 301 wherein each of the portions 114, 116, and 118 may be substantially planar with each other. The profile 301 can be the size of one of the first side-support portion 116, the second side-support portion 118, and the central portion 114.

Figure 8A:
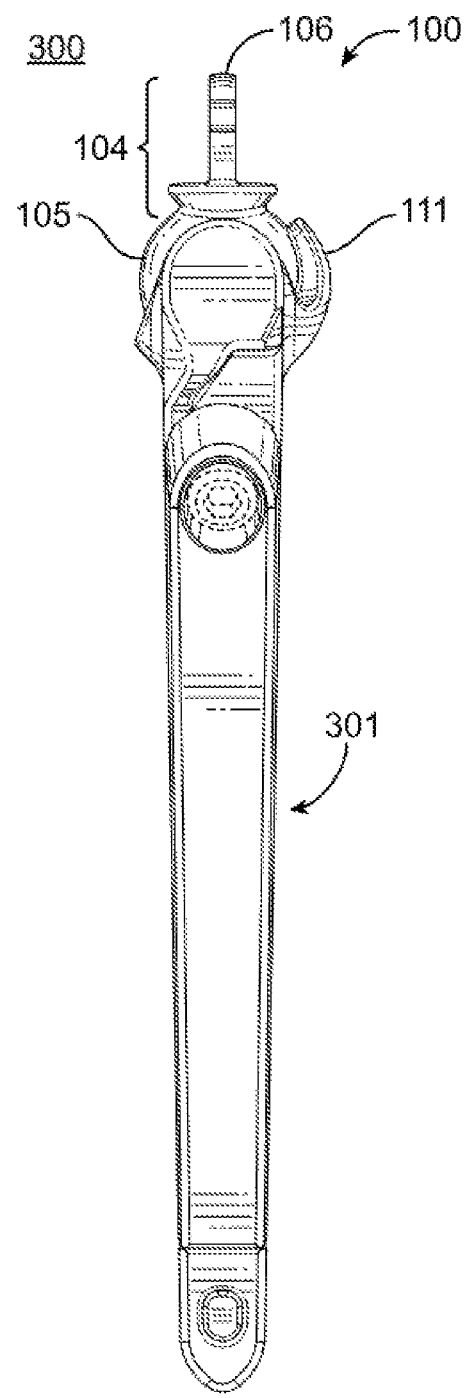
FIG. 8A illustrates a right elevational view of a portable support device in a portable configuration, with an adjustable device receiver in a first position in accordance with an exemplary embodiment.
Figure 8B:
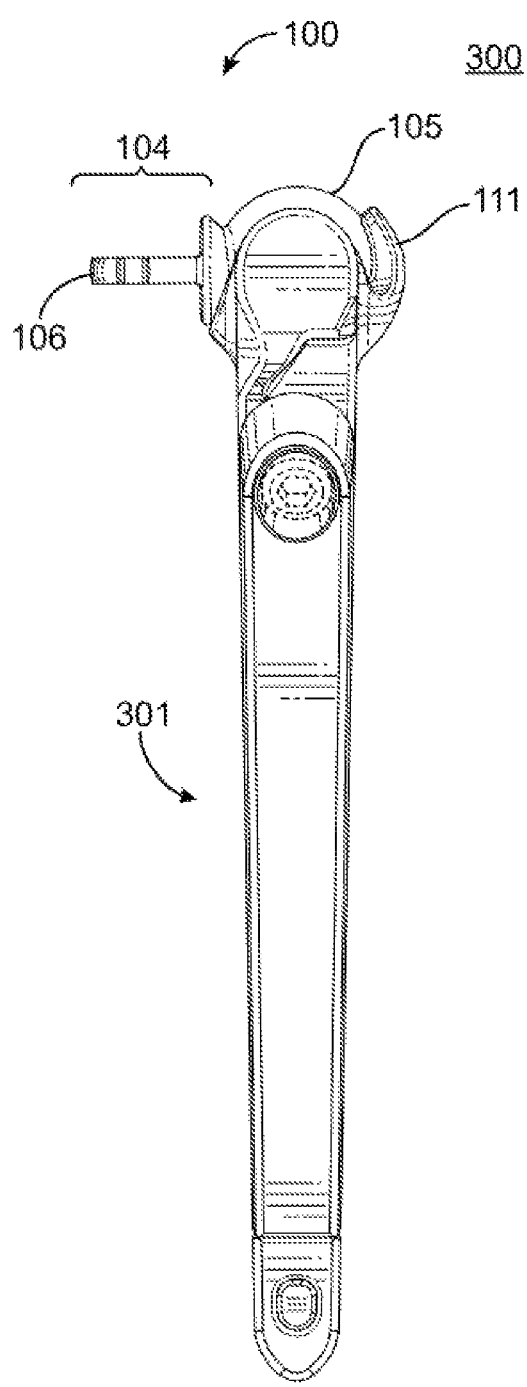
FIG. 8B is similar to FIG. 8A, but with the adjustable device receiver in a second position in accordance with an exemplary embodiment.
Figure 8C:
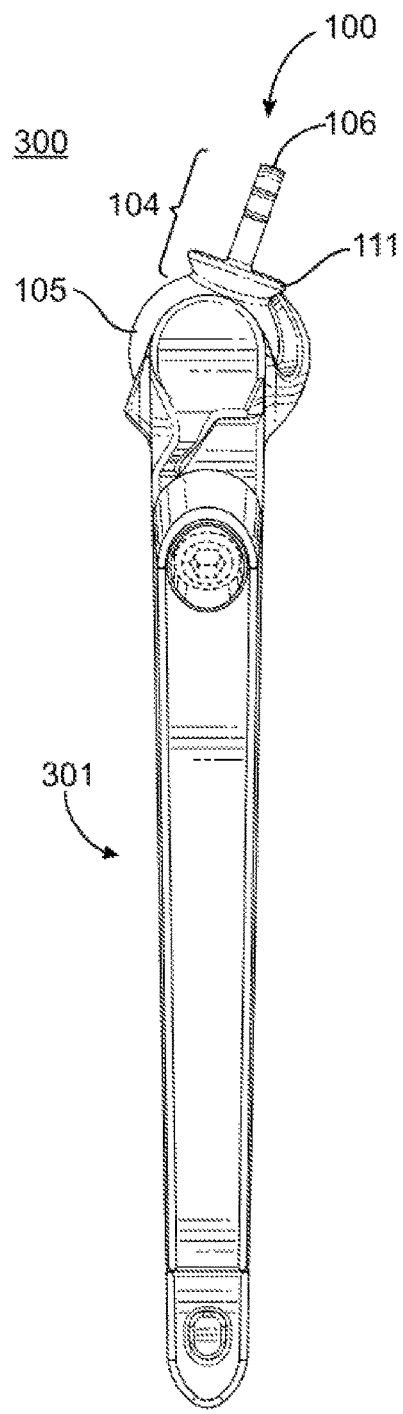
FIG. 8C is similar to FIG. 8A, but with the adjustable device receiver in a third position in accordance with an exemplary embodiment.
Figure 8D:
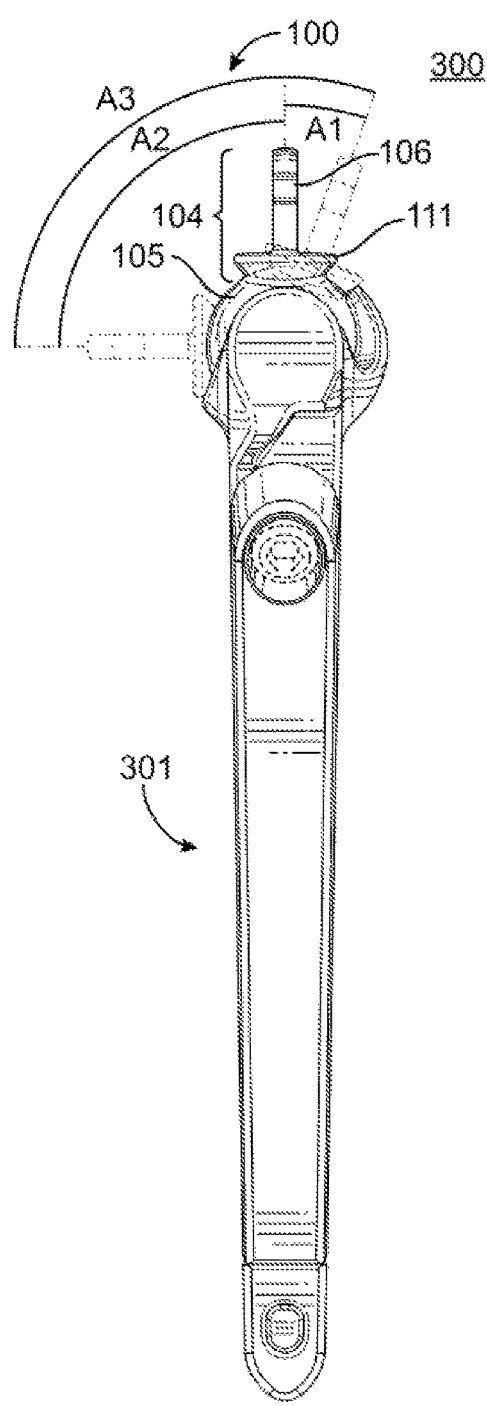
FIG. 8D is similar to FIG. 8A, but illustrating a range of motion of the adjustable device receiver in accordance with an exemplary embodiment.
Figure 13:
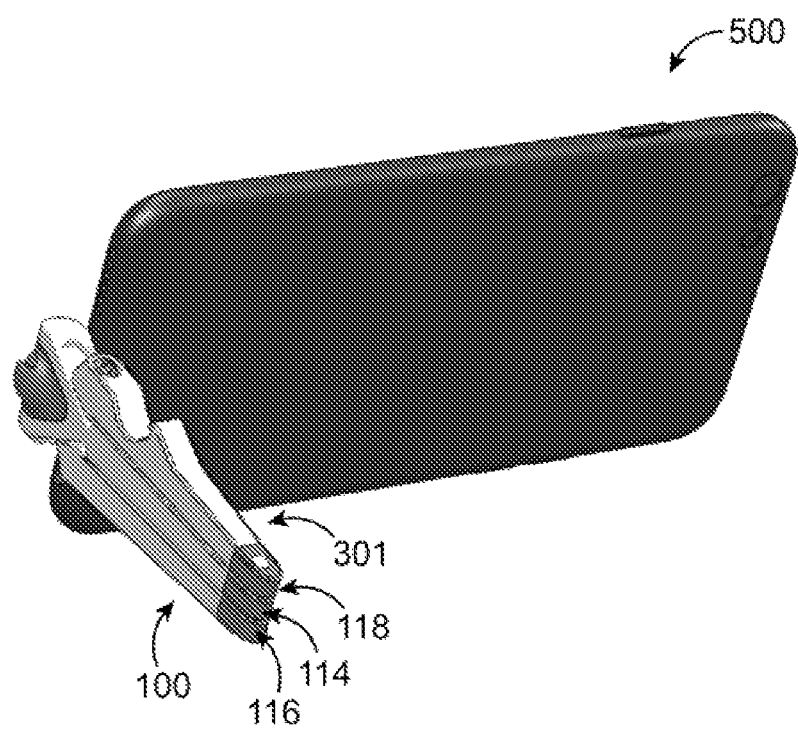
FIG. 13 illustrates a portable support device in use as a kickstand in accordance with an exemplary embodiment.

Referring to FIG. 8A, the ball 105 is positioned such that the tongue 106 is aligned with the profile 301. Referring to FIG. 8B, the ball 105 is positioned such that the tongue 106 is perpendicular to the profile 301. In this position, the portable support device 100 can be used as a kickstand as shown in FIG. 13. Referring to FIG. 8C, the ball 105 is rotated such that the adjustable device receiver 104 is blocked by the device receiver stopper 111. When the adjustable device receiver 104 is blocked by the device receiver stopper 111, the ball 105 cannot rotate further along axis YY (as shown in FIG. 1B). FIG. 8D illustrates the range of motion of the ball 105 along axis Y-Y. The ball 105 can rotate along axis Y-Y to move the adjustable device receiver 104 between angles A1, A2, A3, or any angle within angle A3.

Figure 9:
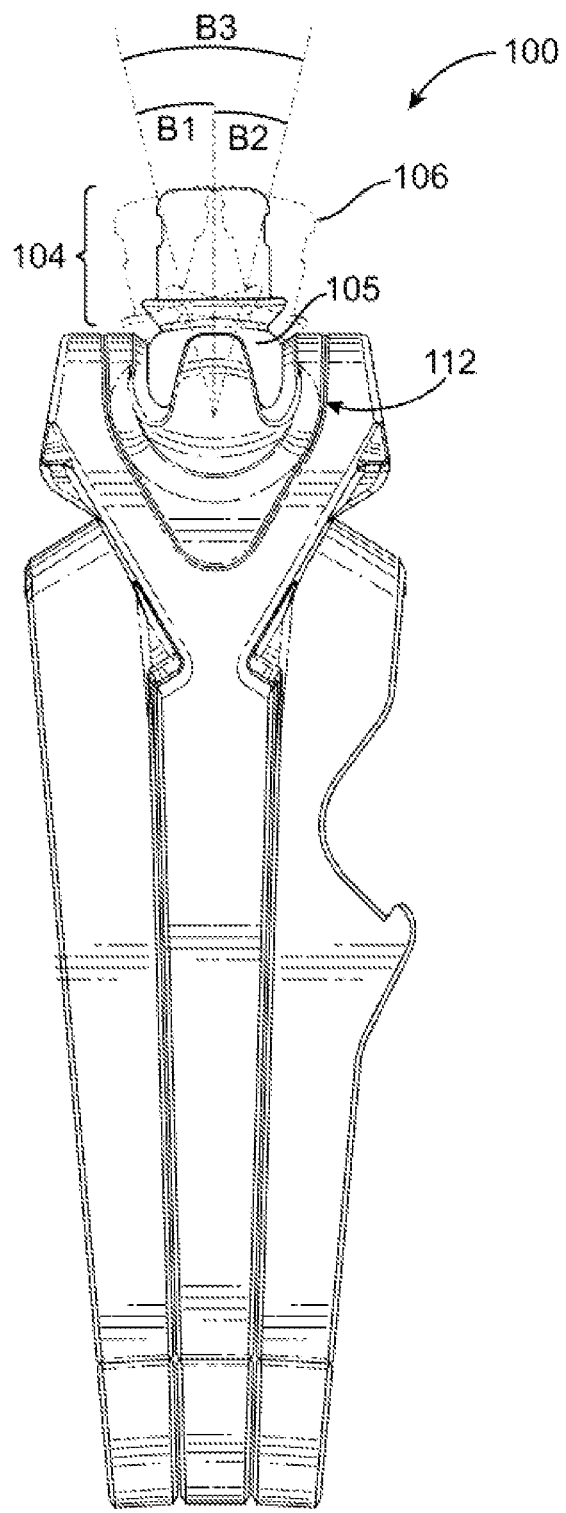
FIG. 9 illustrates a front elevational view of a portable support device in a portable configuration, the adjustable device receiver having another range of motion in accordance with an exemplary embodiment.

Referring to FIG. 9, the adjustable device receiver 104 can also rotate along the axis Z-Z (as shown in FIG. 1B). The ball 105 can rotate along axis Z-Z until the adjustable device receiver 104 is blocked by the receiving yolk 112. As such, the ball can rotate along axis Z-Z to move the adjustable device receiver 104 between angles B1, B2, B3, or any angle within angle B3.

Figure 10:
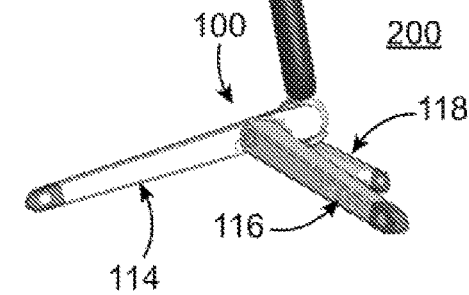
FIG. 10 illustrates a portable support device in a deployed configuration coupled with an electronic device in accordance with an exemplary embodiment.
Figure 11:
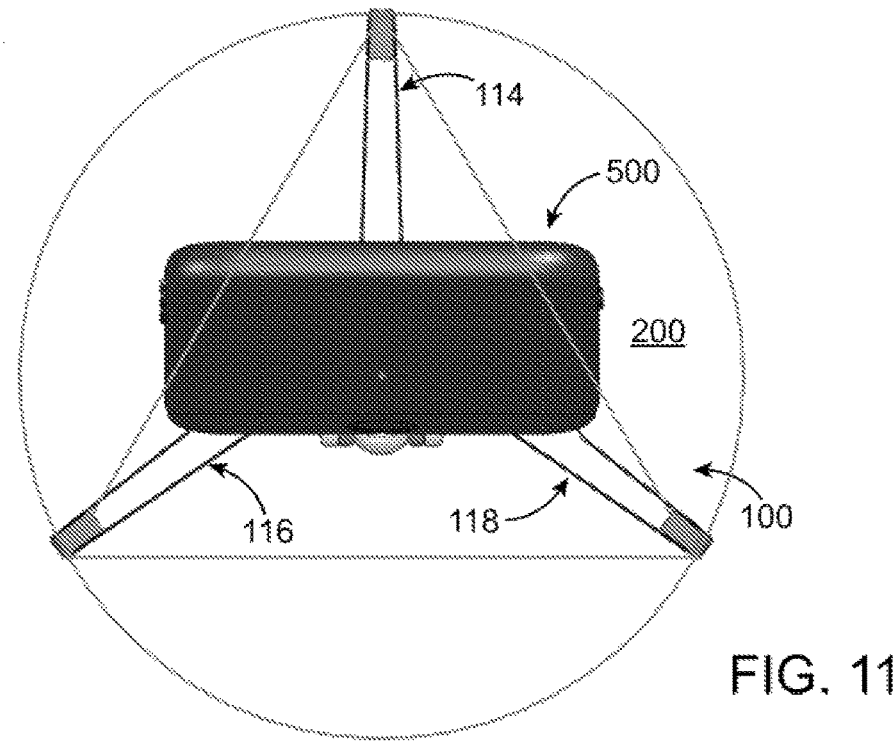
FIG. 11 is similar to FIG. 10, but viewed from another angle in accordance with an exemplary embodiment.

Referring to FIGS. 10 and 11, the portable support device 100 is in a deployed configuration 200 with an electronic device 500 coupled to the portable support device 100. The central portion 114, the first side-support portion 116, and the second side support portion 118 can unfold to an equilateral triangle stance, adding both stability and a pre-determined elevation to the electronic device 500.

Figure 12:
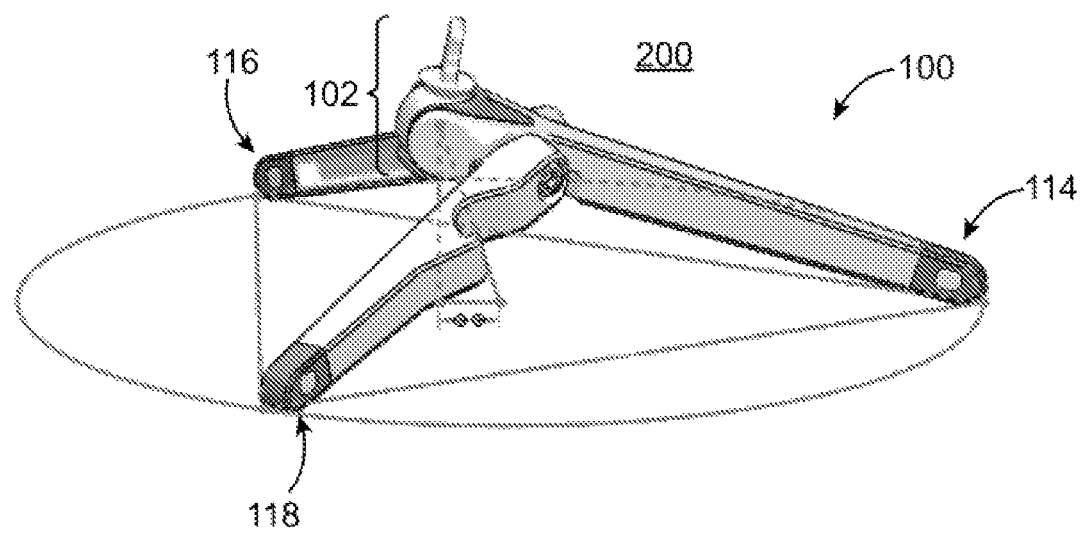
FIG. 12 illustrates a portable support device in a deployed configuration where the positioning of the adjustable device receiver is located at an offset distance from a center of an equilateral stance in accordance with an exemplary embodiment.

FIG. 12 illustrates the portable support device 100 in a deployed configuration 200 without an electronic device 500 coupled to the portable support device 100. As mentioned above, along with the central leg 138, the first side-support portion 116 and the second side-support portion 118 can create an equilateral triangle stance as defined by each of portions 114, 116, 118 when deployed as depicted. The joint 102 can be located at on offset distance from the center of the equilateral triangle stance. In this respect, when the electronic device 500 is tilted back to face the front of the electronic device 500 upward toward the user, the offset distance can move the center of mass for the electronic device 500 to more closely align with the center of the equilateral triangle stance. This is particularly advantageous as the depicted alignment can improve the stability of the portable support device 100. The backward tilt can move the center of mass of the electronic device 500 toward the rear of the stance while the offset moves the center of mass forward.

FIG. 13 illustrates the portable support device 100 in a portable configuration 300 with the electronic device 500 coupled to the portable support device 100. In the depicted portable configuration 300, the central portion 114, the first side-support portion 116, and the second side-support portion 118 can align with each other as previously-described to form a profile 301. When the adjustable device receiver 104 is in a position perpendicular to the profile 301, the portable support device 100 can be used as a kickstand, where either the first side-support portion 116 or the second side-support portion 118 can stabilize the electronic device 500. The electronic device 500 can be in a landscape orientation.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

The invention claimed is:

1. A portable support apparatus for an electronic device that includes at least one of a charging port, an audio port, a Lightning port, or a micro Universal Serial Bus (micro-USB) port, the portable support apparatus comprising:
    a central portion including a yolk retainer coupled to a proximal end of a central leg, and a central foot coupled to a distal end of the central leg, the central portion having a longitudinal axis (X-X) running from the proximal end to the distal end, the central portion having a first stop support included on a first side of the central portion and a second stop support included on a second side of the central portion;
    a first side-support portion including a first shoulder pivotally coupled to the first side of the central portion, and a first side-leg coupled to a first side-foot;
    a second side-support portion including a second shoulder pivotally coupled to the second side of the central portion, and a second side-leg coupled to a second side-foot;
    a ball joint including a receiving yolk connected to the yolk retainer;
    the ball joint including an adjustable device receiver, the adjustable device receiver having a ball-connector received within the receiving yolk, and a tongue extending from the ball-connector, the tongue being insertable into and thereby receivable within at least one of a charging port, an audio port, a Lightning port, or a micro-USB port of the electronic device;

wherein when the apparatus is in a deployed configuration the first side-leg is pivoted until blocked by the first stop support included on the first side of the central portion and the second side-leg is pivoted until blocked by the second stop support included on the second side of the central portion.

2. The apparatus of claim 1, wherein when the apparatus is in a portable configuration the first side-leg and the second side-leg are within a side profile of the central portion, and wherein when the apparatus is in the deployed configuration the first side-leg and the second side-leg are each at a predetermined angle relative to the central leg to form a tripod.

3. The apparatus of claim 2, wherein the predetermined angle is in excess of one hundred and thirty degrees.

4. The apparatus of claim 2, wherein:
the central foot, the first side-foot, and the second side-foot, form an equilateral triangle when the portable support apparatus is in the deployed configuration; and
the adjustable device receiver is eccentric with respect to a circle running through the corners of the equilateral triangle formed when the portable support apparatus is in the deployed configuration.

5. The apparatus of claim 1, wherein the ball-connector of the adjustable device receiver is resiliently pivotable and resiliently rotatable within a receiving area of the receiving yolk.

6. The apparatus of claim 1, wherein the adjustable receiver has:
a predetermined maximum range of pivotation of one hundred and eleven degrees with respect to the longitudinal axis (X-X) of the central portion; and
a predetermined maximum range of pivotation of twenty-eight degrees with respect to a plane that is perpendicular to an axis (Y-Y) running between first and second yolk shoulders positioned opposite each other on the ball joint, and aligned with the longitudinal axis (X-X) of the central portion.

7. The portable support apparatus of claim 1, wherein at least one the first side-leg and the second side-leg comprises an opening tool including a fillet and an indent portion and that is operable as a bottle opener.

8. The portable support apparatus of claim 1, wherein the receiving yolk exerts a compressive force upon the ball-connector.

9. The portable support apparatus of claim 1, wherein:
the ball-connector and the tongue are integrally formed of a material comprising hard plastic; and
the receiving yolk is formed of a material comprising a plastic softer than that of the ball-connector.

10. A portable support device for a portable computing device that is capable of being used in both portrait and landscape orientations, the portable support device comprising:
a central portion comprising proximal and distal ends, a yolk retainer being positioned on the proximal end of the central portion and a central foot being positioned on the distal end of the central portion;
a first side portion having a proximal end pivotally coupled to a first side of the central portion, a first foot of the first side portion being positioned on a distal end opposite the proximal end of the first side portion;
a second side portion having a proximal end pivotally coupled to a second side of the central portion, a second foot of the second side portion being positioned on a distal end opposite the proximal end of the second side portion; and
a ball joint rotatably engaged with the yolk retainer, the ball joint rotatable between a plurality of positions and orientations;
the ball joint including a device receiver operable to be removably coupled to the portable computing device;
the portable support device configured to be selectively maneuvered into a deployed configuration and into a portable configuration;
the portable support device, when maneuvered into its deployed configuration, having the first side portion and the second side portion each at a predetermined angle relative to the central portion to form a tripod that is configured to support a portable computing device, which is coupled to the device receiver, in a portrait orientation of the portable computing device, by holding the portable computing device in its portrait orientation above a horizontal surface; and
the portable support device, when maneuvered into its portable configuration, having the first side portion and the second side portion within a side profile of the central portion to form a kickstand that is configured to support a portable computing device, which is coupled to the device receiver, in a landscape orientation of the portable computing device, by enabling the portable computing device in its landscape orientation to lean against the portable support device in its portable configuration while a side of the portable computing device in its landscape orientation and a distal end of the kickstand each rests on a horizontal surface;
wherein each of the central portion, the first side portion, and the second side portion tapers downward from the proximal end thereof to the distal end thereof; and
wherein the kickstand, formed by the portable support device when maneuvered into its portable configuration, tapers downward from a proximal end of the kickstand, adjacent to which is located the device receiver, to the distal end of the kickstand.

11. The device of claim 10, wherein the predetermined angle is at least one hundred and thirty degrees.

12. The device of claim 10, wherein the tripod formed, when the portable support device is maneuvered into its deployed configuration, being operable to mechanically attach to and move the portable computing device between a plurality of positions and orientations.

13. The device of claim 10, wherin when the portable support device is maneuvered into its deployed configuration, the central, first, and second feet form an equilateral triangle, and the device receiver is eccentric with respect to a circle running through corners of the equilateral triangle.

14. The device of claim 10, wherein a connecting ball of the device receiver is resiliently rotatable within a receiving area of the yolk retainer.

15. The device of claim 14, wherein the device receiver has a predetermined rotational range of one hundred and eleven degrees with respect to a longitudinal axis running from the proximal to distal ends of the central portion.

16. The device of claim 14, wherein the device receiver has a predetermined rotational range of twenty-eight degrees with respect to a plane perpendicular to an axis running between first and second yolk shoulders positioned opposite each other on the ball joint; and wherein the device receiver is aligned with a longitudinal axis running from the proximal to distal ends of the central portion.

17. A portable support device for a portable computing device, the device comprising:
a central portion comprising proximal and distal ends, a yolk retainer being positioned on the proximal end of the central portion and a central foot being positioned on the distal end of the central portion;
a first side portion having a proximal end pivotally coupled to a first side of the central portion, a first foot of the first side portion being positioned on a distal end opposite the proximal end of the first side portion;
a second side portion having a proximal end pivotally coupled to a second side of the central portion, a second foot of the second side portion being positioned on a distal end opposite the proximal end of the second side portion; and
a ball joint rotatably engaged with the yolk retainer, the ball joint rotatable between a plurality of positions and orientations;
the ball joint including a device receiver operable to be removably coupled to the portable computing device;
wherein at least one of the first or second side portions comprise an opening tool that is integrally formed with the at least one of the first or second side portions, the opening tool including a fillet and an indent portion formed in the at least one of the first or second side portions, the fillet and the ident portion being adjacent one another, and wherein the opening tool is a bottle opener.

18. The device of claim 10, wherein a ball-connector and a tongue of the device receiver are integrally formed.

19. The device of claim 14, wherein a receiving yolk of the ball joint exerts a compressive force upon a ball-connector of the device receiver to move the device receiver between the predetermined rotational range.

20. The device of claim 14, wherein each of the first and second side portions are operable to be rotated in the deployed configuration until contacting respective first and second stop supports included, respectively, on first and second sides of the central portion.

21. The device of claim 20, wherein each of the stop supports are oriented in a predetermined angle relative to the longitudinal axis of the central portion so that the respective side portion is flush with the respective stop support in the deployed configuration.

22. The device of claim 20, wherein one or both of the stop supports further comprises a locking mechanism to secure the stop support to the respective side portion.

23. The device of claim 22, wherein the locking mechanism is a click fit connector, a band, or a hook and loop fastener.

24. The device of claim 10, wherein the device receiver comprises a ball and a tongue extending therefrom, the tongue being insertable into and thereby receivable within at least one of a charging port, an audio port, a Lightning port, or a micro-USB port of the portable computing device.

25. A portable support apparatus for an electronic device, the portable support apparatus transitionable between a portable configuration and a deployed configuration, the portable support apparatus comprising:
a Y-shaped central portion that provides a first leg of a tripod when the apparatus is in the deployed configuration;
a first side-support portion including a first shoulder pivotally coupled to a first side of the Y-shaped central portion, the first side-support portion providing a second leg of the tripod when the apparatus is in the deployed configuration;
a second side-support portion including a second shoulder pivotally coupled to a second side of the Y-shaped central portion, the second side-support portion providing a third leg of the tripod when the apparatus is in the deployed configuration; and
a ball joint coupled to the Y-shaped central portion and including an adjustable device receiver;
wherein when the apparatus is in the portable configuration,
first flat outer surfaces of each of the Y-shaped central portion, the first side-support portion, and the second side-support portion, are co-planar with one another, and
second flat outer surfaces of each of the Y-shaped central portion, the first side-support portion, and the second side-support portion, which are opposite the respective first flat outer surfaces, are co-planar with one another.

26. The apparatus of claim 25, wherein the ball joint includes a ball that is rotatable relative to the Y-shaped central portion and a tongue extending from the ball, the tongue being insertable into and thereby receivable within at least one of a charging port, an audio port, a Lightning port, or a micro-USB port of the electronic device.

27. The apparatus of claim 1, wherein the tongue that extends from the ball connector comprises a waist including opposing indents configured to help stabilize the electronic device being supported by the portable support apparatus.

* * * * *

UNITED STATES PATENT AND TRADEMARK OFFICE
CERTIFICATE OF CORRECTION

PATENT NO.        : 10,088,096 B2
APPLICATION NO.   : 15/525918
DATED             : October 2, 2018
INVENTOR(S)       : Minn et al.

Page 1 of 1

It is certified that error appears in the above-identified patent and that said Letters Patent is hereby corrected as shown below:

In the Claims

Column 12, Line 49, (Claim 13, Line 1): After "claim 10" and before "when" delete "wherin" and insert -- wherein --.

Column 13, Line 27, (Claim 17, Line 27): After "the" and before "portion" delete "ident" and insert -- indent --.

Signed and Sealed this
Ninth Day of April, 2019

Andrei Iancu
*Director of the United States Patent and Trademark Office*